United States Patent Office 2,701,215
Patented Feb. 1, 1955

2,701,215

METHOD OF COLORING GLASS AND RESULTING ARTICLE

William H. Kroeck, Corning, N. Y., assignor to Corning Glass Works, Corning, N. Y., a corporation of New York No Drawing. Application May 29, 1953, Serial No. 358,540

22 Claims. (Cl. 117—65)

This invention relates to the treatment of glass to produce a coloration in its surface with copper, which procedure is commonly known as copper-staining.

As conventionally practiced, such process generally includes initially heating a glass containing an alkali-metal oxide at a temperature somewhat below its softening point while in contact with a copper-staining composition comprising a paste or liquid containing a salt or compound of copper to produce in the glass a yellow or greenish-yellow surface coloration and subsequently heating the glass in a reducing atmosphere to convert such yellow color to red. (Softening point as used herein is that temperature at which the viscosity of the glass is $10^{7.6}$ poises.) During such treatment, copper ions from the copper-staining composition in contact with the glass migrate into its surface in exchange for alkali-metal ions from the glass, the reaction being facilitated or accelerated by increase in the temperature. The red coloration is caused by reduction of such copper ions to metallic copper.

In the utilization of such process for the production of red light-directing lenses or cover glasses for lamps of the type known as "Sealed Beam" lamps, it is difficult to introduce enough copper into the glass surface to provide the desired special characteristics, that is, a sufficient absorption of blue and green wave-lengths together with a high enough transmission of the red. While the amount of migrated copper in the surface of the glass can to some extent be increased by increasing the time and temperature of firing, this also increases the tendency of the glass article to warp. Repeated or additional applications of the staining composition to the glass in order to avoid the use of excessive temperature and the resulting deformation of the ware result in a non-uniform coloration and the development of haziness in the glass. Alterations in the staining composition including the use of a variety of copper compounds and an increase in the copper content of the composition are likewise ineffective. The use of copper sulfides and of free sulphur in the staining composition, although sometimes recommended for improving the color, does not increase the migration of copper into the glass sufficiently for the present purpose.

I have now discovered that such migration of copper into the glass can be enhanced and that copper-stained glass of uniform color having the indicated spectral characteristics and free of haziness can be produced at temperatures low enough to avoid distortion by initially heating the glass while in contact with a copper-staining composition in an atmosphere containing a substantial amount of $SO_2$, preferably an atmosphere resulting from controllably burning sulfur in air, to develop a yellow color therein and thereafter heating the glass in a reducing atmosphere desirably substantially free of $SO_2$ until the color due to copper in the glass is red.

Staining compositions suitable for the practice of this invention comprise generally one or more copper components, such as $CuO$, $Cu_2O$, $CuS$, $Cu_2S$, $CuSO_4$ or $Cu_2Cl_2$, the equivalent $Cu$ content usually amounting to about 40% or more by weight of the total solids of the composition, the balance of the solids comprising an inert material or materials such as clay, ocher, or $BaCO_3$. These solids are dispersed or suspended in a vehicle such as lavender oil or other essential oil, turpentine, or water to form a paste or liquid which is applied to the glass as by brushing, spraying, or dipping. The vehicle is then evaporated slowly enough to avoid bubbling, and the coated glass is placed in a suitably heated kiln.

To facilitate and increase the migration of copper ions into the glass, an atmosphere containing a substantial amount of $SO_2$ is created in the kiln in accordance with this invention. This may be done by introducing gaseous $SO_2$ from an external source, such as bottled $SO_2$ or elemental sulfur controllably burned in air, into the kiln but may also be accomplished by burning flowers of sulfur in the kiln adjacent the coated glassware. During such treatment the door of kiln is kept closed to prevent substantial ingress of air. Sulfur, burned in air in the kiln, combines with the oxygen and produces a mixture consisting primarily of $SO_2$ and $N_2$. While relatively small amounts of $SO_2$ are to some extent effective, an appreciable staining improvement requires at least about 25% $SO_2$ by volume. When $SO_2$ is introduced into the kiln from an external source to displace the air from the kiln, however, at least about 75% of $SO_2$ by volume is required for the optimum staining improvement. Desirably not all of the air is displaced by $SO_2$ since I have found that an atmosphere consisting of $SO_2$ alone tends to reduce the copper ions, which at this stage of the process results in nonuniformity of color and a tendency to precipitate metallic copper in the staining composition. The $SO_2$ should accordingly preferably comprise not over about 90% of the atmosphere by volume. Suitable conditions are readily determined by trial and I have found, for example that in an electrically heated kiln having a capacity of 45 cubic feet 8 oz. of flowers of sulfur is a satisfactory initial quantity but that subsequent heat treatments in the same kiln without permitting complete diffusion and dissipation of $SO_2$ trapped in the refractories, require smaller amounts of sulfur, the quantity for the third consecutive heat treatment and all thereafter being 4 oz.

While practically any compound of copper can be utilized in carrying out the invention, I have found that $CuO$ produces the best result. Although the addition of elemental sulfur to the staining composition might be expected to provide an atmosphere of $SO_2$ effective for the present purpose, I have found that such is not the case. The presence of sulfur in the copper-staining composition not only fails to produce the desired result but it causes non-uniformity of coloration due to variable local reaction caused by uneven combustion and/or evaporation of the sulfur.

Analysis shows that the amount of migrated copper per unit area in glass treated in accordance with the method of this invention is substantially larger than the amount produced by the same copper-staining composition in the same glass but heated in an atmosphere free of $SO_2$. Moreover such increase in the copper content of the glass may be brought about at a lower temperature. A borosilicate glass having a softening point of 780° C. and an annealing point of 528° C., when treated according to the method of this invention and heated at 585° C., contains as much or more copper per unit area than when heated at 620° C. in an atmosphere free of $SO_2$. (Annealing point as used herein is that temperature at which the viscosity of the glass is $10^{13.4}$ poises.) With borosilicate glasses, generally good results are obtained by heating in accordance with this invention for about 30 minutes at a temperature about 50° C. above the annealing point of the glass or for about 15 minutes at about 100° C. above its annealing point. Soda-lime glasses and other glasses having similarly high alkali-metal oxide contents produce comparable results at temperatures relatively somewhat lower than those required for borosilicate glasses, on account of their higher alkali-metal oxide contents and the resulting higher rate of exchange of the copper ions for alkali-metal ions.

Following such heat treatment in the atmosphere containing $SO_2$, the treated glass has a yellow color which may be converted to a red color having the desired spectral characteristics by heating the glass in a reducing atmosphere, that is, an atmosphere of a reducing gas, such as $H_2$, $CO$, a mixture of $H_2$ and $N_2$ or, preferably, natural gas which has been partially burned so as to contain substantial $H_2$ and $CO$, such dilute mixture being milder in action than the pure gases. For such reducing heat-treatment a temperature nearer the annealing point of the glass may, if desired, be employed and at least 15 minutes is required with a strong reducing gas. While a relatively small amount of SO₂ in the atmosphere is not objectionable at this stage, its presence in large amounts is not desirable because any substantial dilution of the more active reducing gases recited above by the SO₂, which is relatively a mild reducing agent, objectionably increases the time required for proper reduction.

The residual copper-staining composition is preferably removed from the glass following its heat-treatment in the SO₂ atmosphere, at which time it is easily scoured off. No harm results, however, if such residue is left on the glass until after the final or reducing heat-treatment.

The above-described heat-treatment in an atmosphere containing SO₂ in accordance with this invention surprisingly is effective only for copper-staining. The well-known silver-staining process, which in many respects is practically the same as the conventional copper-staining process, is not improved by initially heating the coated glass in an atmosphere containing SO₂. The presence of a silver compound in the copper-staining composition, however, does not hinder or otherwise interfere with the increase in the exchange of copper ions for the alkali-metal ions of the glass caused by the heat treatment in an atmosphere containing SO₂. Such addition of a silver compound to the copper-staining composition results in a color which is yellow to amber. For the production of an amber coloration, therefore, in accordance with this invention I may add a substantial amount of a silver compound, such as $AgNO_3$, $AgCl$, $Ag_2S$, $Ag_2O$ or $Ag_2CO_3$, to the copper-staining composition. With such a staining composition practically the maximum coloration is developed in the glass when fired in an atmosphere of SO₂. Subsequent firing in a reducing atmosphere has no further beneficial effect and, accordingly, is omitted.

While this invention, as described above, is directed to the production of light-directing lenses having a specific spectral transmission, it is also applicable and beneficial in the production of any other kind of similarly stained ware made of a glass containing a substantial amount of alkali-metal oxide.

What I claim is:

1. The method of copper-staining the surface of an article comprising a body of a glass containing an alkali-metal oxide which comprises applying to such surface a copper staining composition, heating the glass between its annealing point and its softening point while in contact with said staining composition in an atmosphere containing at least about 25% of SO₂ by volume to develop a yellow color in the glass, and thereafter heating the glass in said temperature range in a reducing atmosphere until the color due to copper in the glass is red.

2. A glass article made by the method of claim 1.

3. The method as claimed in claim 1, in which the copper compound is CuO.

4. The method as claimed in claim 1 in which the SO₂ is obtained by burning sulfur in air.

5. The method as claimed in claim 1 in which the SO₂ amounts to about 75% to 90% by volume.

6. The method of staining the surface of an article comprising a body of a glass containing an alkali-metal oxide which comprises applying to such surface a copper staining composition containing a compound of silver and heating the glass between its annealing point and its softening point while in contact with said staining composition in an atmosphere containing at least about 25% of SO₂ by volume to develop a yellow to amber color in the glass.

7. A glass article made by the method of claim 6.

8. The method as claimed in claim 6, in which the compound of copper is CuO.

9. The method as claimed in claim 6 in which the SO₂ is obtained by burning sulfur in air.

10. The method as claimed in claim 6 in which the amount of SO₂ amounts to about 75% to 90% by volume.

11. In the method of staining the surface of an article comprising a body of a glass containing an alkali-metal oxide wherein the glass is heated between its annealing point and its softening point in contact with a copper staining composition to develop a yellow color in the glass, the improvement which comprises effecting such heating in an atmosphere containing at least about 25% of SO₂ by volume.

12. In the method of staining the surface of an article comprising a body of a glass containing an alkali-metal oxide wherein the glass is heated between its annealing point and its softening point in contact with a copper staining composition to develop a yellow color in the glass, the improvement which comprises effecting such heating in an atmosphere containing about 75% to 90% of SO₂ by volume.

13. The method of copper-staining the surface of an article comprising a body of a glass containing an alkali-metal oxide which comprises applying to such surface a copper staining composition, heating the glass between its annealing point and its softening point while in contact with said staining composition, maintaining during such heating an atmosphere containing at least about 25% of SO₂ by volume adjacent the surface being stained to develop a yellow color in the glass and thereafter heating the glass in said temperature range in a reducing atmosphere until the color due to copper in the glass is red.

14. The method of staining the surface of an article comprising a body of a glass containing an alkali-metal oxide which comprises applying to such surface a copper staining composition containing a compound of silver, heating the glass between its annealing point and its softening point while in contact with said staining composition and maintaining during such heating an atmosphere containing at least about 25% of SO₂ by volume adjacent the surface being stained to develop a yellow to amber color in the glass.

15. In the method of staining the surface of an article comprising a body of a glass containing an alkali-metal oxide wherein the glass is heated between its annealing point and its softening point in contact with a copper staining composition to develop a yellow color in the glass, the improvement which comprises maintaining during such heating an atmosphere containing at least about 25% of SO₂ by volume adjacent the surface being stained.

16. The method of copper-staining the surface of an article comprising a body of a glass containing an alkali-metal oxide which comprises applying to such surface a staining composition containing a compound of copper selected from the group consisting of $CuO$, $Cu_2O$, $CuS$, $Cu_2S$, $CuSO_4$, and $Cu_2Cl_2$, heating the glass between its annealing point and its softening point while in contact with said staining composition in an atmosphere containing at least about 25% of SO₂ by volume to develop a yellow color in the glass, and thereafter heating the glass in said temperature range in a reducing atmosphere until the color due to copper in the glass is red.

17. The method of staining the surface of an article comprising a body of a glass containing an alkali-metal oxide which comprises applying to such surface a staining composition containing a compound of copper selected from the group consisting of $CuO$, $Cu_2O$, $CuS$, $Cu_2S$, $CuSO_4$, and $Cu_2Cl_2$, and a compound of silver selected from the group consisting of $AgNO_3$, $AgCl$, $Ag_2S$, $Ag_2O$ and $Ag_2CO_3$ and heating the glass between its annealing point and its softening point while in contact with said staining composition in an atmosphere containing at least about 25% of SO₂ by volume to develop a yellow to amber color in the glass.

18. In the method of staining the surface of an article comprising a body of a glass containing an alkali-metal oxide wherein the glass is heated between its annealing point and its softening point in contact with a staining composition containing a compound of copper selected from the group consisting of $CuO$, $Cu_2O$, $CuS$, $Cu_2S$, $CuSO_4$, and $Cu_2Cl_2$, to develop a yellow color in the glass, the improvement which comprises effecting such heating in an atmosphere containing at least about 25% of SO₂ by volume.

19. In the method of staining the surface of an article comprising a body of a glass containing an alkali-metal oxide wherein the article is heated in contact with a staining composition containing a compound of copper selected from the group consisting of $CuO$, $Cu_2O$, $CuS$, $Cu_2S$, $CuSO_4$, and $Cu_2Cl_2$, to develop a yellow color in the glass, the improvement which comprises effecting such heating in an atmosphere containing at least about 75% to 90% of SO₂ by volume.

20. The method of copper-staining the surface of an article comprising a body of a glass containing alkali-metal oxide which comprises applying to such surface a staining composition containing a compound of copper selected from the group consisting of $CuO$, $Cu_2O$, $CuS$, $Cu_2S$, $CuSO_4$, and $Cu_2Cl_2$, heating the glass between its annealing point and its softening point while in contact with said staining composition, maintaining during such heating an atmosphere containing at least about 25% of $SO_2$ by volume adjacent the surface being stained to develop a yellow color in the glass and thereafter heating the glass in said temperature range in a reducing atmosphere until the color due to copper in the glass is red.

21. The method of staining the surface of an article comprising a body of a glass containing an alkali-metal oxide which comprises applying to such surface a staining composition containing a compound of copper selected from the group consisting of $CuO$, $Cu_2O$, $CuS$, $Cu_2S$, $CuSO_4$, and $Cu_2Cl_2$, and a compound of silver, selected from the group consisting of $AgNO_3$, $AgCl$, $Ag_2S$, $Ag_2O$, and $Ag_2CO_3$, heating the glass between its annealing point and its softening point while in contact with said staining composition and maintaining during such heating an atmosphere containing at least about 25% of $SO_2$ by volume adjacent the surface being stained to develop a yellow to amber color in the glass.

22. In the method of staining the surface of an article comprising a body of a glass containing an alkali-metal oxide wherein the glass is heated between its annealing point and its softening point in contact with a staining composition containing a compound of copper selected from the group consisting of $CuO$, $Cu_2O$, $CuS$, $Cu_2S$, $CuSO_4$, and $Cu_2Cl_2$, to develop a yellow color in the glass, the improvement which comprises maintaining during such heating an atmosphere containing at least 25% of $SO_2$ by volume adjacent the surface being stained.

References Cited in the file of this patent

UNITED STATES PATENTS

| | | |
|---|---|---|
| 402,090 | Leighton | Apr. 23, 1889 |
| 1,947,781 | Kreidl | Feb. 20, 1934 |
| 2,428,600 | Williams | Oct. 7, 1947 |
| 2,486,566 | Kreidl | Nov. 1, 1949 |
| 2,498,003 | Peterson | Feb. 21, 1950 |
| 2,662,037 | Levi | Dec. 8, 1953 |